(12) United States Patent
Baik et al.

(10) Patent No.: US 10,976,477 B2
(45) Date of Patent: Apr. 13, 2021

(54) OPTICAL FILTER AND SPECTROMETER INCLUDING SUB-WAVELENGTH REFLECTOR, AND ELECTRONIC APPARATUS INCLUDING THE SPECTROMETER

(71) Applicant: SAMSUNG ELECTRONICS CO., LTD., Suwon-si (KR)

(72) Inventors: Chanwook Baik, Yongin-si (KR); Kyungsang Cho, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/437,832

(22) Filed: Jun. 11, 2019

(65) Prior Publication Data

US 2020/0073033 A1 Mar. 5, 2020

Related U.S. Application Data

(60) Provisional application No. 62/725,850, filed on Aug. 31, 2018.

(30) Foreign Application Priority Data

Jan. 11, 2019 (KR) .................. 10-2019-0003948

(51) Int. Cl.
*G02B 5/28* (2006.01)
*G01J 3/02* (2006.01)
*G02B 5/20* (2006.01)

(52) U.S. Cl.
CPC ............ *G02B 5/284* (2013.01); *G01J 3/0205* (2013.01); *G02B 5/207* (2013.01)

(58) Field of Classification Search
CPC ...................................... G02B 5/284
USPC ............................................. 356/300
See application file for complete search history.

(56) References Cited

U.S. PATENT DOCUMENTS

| 6,791,757 B2 | 9/2004 | Hobbs et al. |
| 8,274,739 B2 | 9/2012 | Lee et al. |
| 2006/0176485 A1* | 8/2006 | Bulovic .............. G01J 3/0259 356/419 |
| 2010/0091369 A1 | 4/2010 | Hoose |

(Continued)

FOREIGN PATENT DOCUMENTS

| CN | 108731806 A | 11/2018 |
| EP | 3379214 A1 | 9/2018 |
| KR | 10-2018-0108212 A | 10/2018 |

OTHER PUBLICATIONS

Bernardo B. C. Kyotoku et al., "Sub-nm resolution cavity enhanced micro-spectrometer" Optics Express, vol. 18, No. 1, Jan. 5, 2010, (pp. 102-107).

(Continued)

*Primary Examiner* — Tarifur R Chowdhury
*Assistant Examiner* — Omar H Nixon
(74) *Attorney, Agent, or Firm* — Sughrue Mion, PLLC

(57) ABSTRACT

An optical filter includes a first reflector including a plurality of first sub-wavelength structures that are two-dimensionally arranged and spaced apart by a first period based on a first rule, and a second reflector provided separate from the first reflector, the second reflector including a plurality of second sub-wavelength structures that are two-dimensionally arranged and spaced apart by a second period based on a second rule.

22 Claims, 18 Drawing Sheets

(56) References Cited

U.S. PATENT DOCUMENTS

| | | |
|---|---|---|
| 2010/0328587 A1 | 12/2010 | Yamada et al. |
| 2012/0194911 A1 | 8/2012 | Li et al. |
| 2012/0236382 A1 | 9/2012 | Puegner et al. |
| 2012/0262190 A1* | 10/2012 | Kondo ............... G01N 21/3581 324/639 |
| 2015/0285677 A1 | 10/2015 | Lee et al. |
| 2017/0059777 A1* | 3/2017 | Han .................. G02B 6/29356 |
| 2018/0052048 A1* | 2/2018 | Roh ...................... G01J 3/0278 |
| 2018/0274977 A1 | 9/2018 | Baik et al. |

OTHER PUBLICATIONS

Zhixuan Xia et al., "High resolution on-chip spectroscopy based on miniaturized microdonut resonators" Optics Express, vol. 19, No. 13, Jun. 20, 2011, (pp. 12356-12364).

Yu Horie et al., "High resolution on-chip optical filter array based on double subwavelength grating reflectors" Optics Express, vol. 23, No. 23, Nov. 16, 2015, (pp. 29848-29854).

Chuan Wang et al. "Broadband filter using multi-layer sub-wavelength high-contrast grating structure", Front Opioeiectron, 2014. vol. 7, No. 3, (pp. 393-398) XP035387398.

Communication dated Feb. 5, 2020, from the European Patent Office in counterpart European Application No. 19194050.1.

\* cited by examiner

OPTICAL FILTER AND SPECTROMETER INCLUDING SUB-WAVELENGTH REFLECTOR, AND ELECTRONIC APPARATUS INCLUDING THE SPECTROMETER

CROSS-REFERENCE TO RELATED APPLICATIONS

This application is based on and claims the benefit of U.S. Provisional Patent Application No. 62/725,850, filed on Aug. 31, 2018 in the United States Patent and Trademark Office, and claims priority from Korean Patent Application No. 10-2019-0003948, filed on Jan. 11, 2019 in the Korean Intellectual Property Office, the disclosures of which are incorporated herein by reference in their entireties.

BACKGROUND

1. Field

Example embodiment of the present disclosure relate to an optical filter and a spectrometer which include a sub-wavelength reflector, and an optical apparatus including the spectrometer.

2. Description of the Related Art

An optical device for changing transmission/reflection, polarization, phase, strength, path, etc., of incident light is used in various optical fields. Recently, an attempt has been steadily made to implement an optical device that is microminiaturized and has various optical characteristics by using a structure having a shape dimension of a sub-wavelength.

A sub-wavelength structure may also be used in a spectrometer. A resonant structure of a resonant wavelength may be generally implemented by separating two reflectors by a distance. As a reflector used for the resonant structure, a distributed Bragg reflector may be used in which material layers having different refractive indices are repeatedly stacked to a thickness of ¼ wavelength, and in this case, an increase in the number of layers stacked may occur to increase a refractive index, and the resonant wavelength is implemented by adjusting the distance between the reflectors, thus making it difficult to implement a desired resonant wavelength with a subminiature size.

SUMMARY

One or more example embodiments provide a spectrometer having a relatively small volume and higher spectroscopic performance by using a sub-wavelength pattern.

Additional aspects will be set forth in part in the description which follows and, in part, will be apparent from the description, or may be learned by practice of example embodiments.

According to an aspect of an example embodiment, there is provided an optical filter including a first reflector including a plurality of first sub-wavelength structures that are two-dimensionally arranged and spaced apart by a first period based on a first rule, and a second reflector provided separate from the first reflector, the second reflector including a plurality of second sub-wavelength structures that are two-dimensionally arranged and spaced apart by a second period based on a second rule.

A refractive index of each of the plurality of first sub-wavelength structures and a refractive index of each of the plurality of second sub-wavelength structures may be higher than a refractive index of a peripheral material that surrounds each of the plurality of first sub-wavelength structures and each of the plurality of second sub-wavelength structures, and wherein an absorption coefficient of each of the plurality of first sub-wavelength structures and an absorption coefficient of each of the plurality of second sub-wavelength structures may be lower than an absorption coefficient of the peripheral material.

Each of the plurality of first sub-wavelength structures and each of the plurality of second sub-wavelength structures may include a dielectric material or a semiconductor material.

Each of the plurality of first sub-wavelength structures and each of the plurality of second sub-wavelength structures may have a cylindrical shape or a regular polyprism shape.

The optical filter may further include a substrate having a refractive index that is lower than the refractive index of each of the plurality of first sub-wavelength structures, wherein the first reflector may be provided on the substrate.

The optical filter may further include a first material layer having a refractive index that is lower than the refractive index of each of the plurality of first sub-wavelength structures, wherein the first material layer may encapsulate the first reflector.

The optical filter may further include a second material layer having a refractive index that is lower than the refractive index of each of the plurality of second sub-wavelength structures, wherein the second material layer may be provided on the first material layer and encapsulates the second reflector.

The first material layer and the second material layer may include a same material.

The first rule may be the same as the second rule.

Each of the plurality of first sub-wavelength structures and each of the plurality of second sub-wavelength structures may have a same shape.

The plurality of first sub-wavelength structures and the plurality of second sub-wavelength structures may be respectively arranged to face each other in a direction in which the first reflector and the second reflector are separated.

The plurality of first sub-wavelength structures and the plurality of second sub-wavelength structures may be two-dimensionally arranged in regular triangular lattice forms.

The plurality of first sub-wavelength structures and the plurality of second sub-wavelength structures may be two-dimensionally arranged in square lattice forms.

One of the plurality of first sub-wavelength structures and the plurality of second sub-wavelength structures may be two-dimensionally arranged in a regular triangular lattice form, and the other of the plurality of first sub-wavelength structures and the plurality of second sub-wavelength structures may be two-dimensionally arranged in a square lattice form.

The optical filter may further include a third reflector provided separate from the second reflector, wherein the third reflector may include a plurality of third sub-wavelength structures that are two-dimensionally arranged and spaced apart by a third period based on a third rule.

Each of the plurality of first sub-wavelength structures, each of the plurality of second sub-wavelength structures, and each of the plurality of third sub-wavelength structures may have a same shape.

The plurality of first sub-wavelength structures, the plurality of second sub-wavelength structures, and the plurality of third sub-wavelength structures may be arranged to face each other a direction in which the first reflector and the second reflector are separated.

According to an aspect of an example embodiment, there is provided a spectrometer including a first optical filter including a first reflector including a plurality of first sub-wavelength structures that are two-dimensionally arranged and spaced apart by a first period based on a first rule, and a second reflector including a plurality of second sub-wavelength structures that are two-dimensionally and spaced apart by a second period based on a second rule, a second optical filter including a third reflector including a plurality of third sub-wavelength structures that are two-dimensionally arranged and spaced apart by a third period based on a third rule, and fourth reflector including a plurality of fourth sub-wavelength structures that are two-dimensionally arranged and spaced apart by a fourth period based on a fourth rule, and a sensor substrate including a plurality of light detectors provided to face the first optical filter and the second optical filter.

The sensor substrate, the first optical filter, and the second optical filter may be formed monolithically.

According to an aspect of an example embodiment, there is provided an electronic apparatus including a light source configured to radiate light, a spectrometer provided on a path of light emitted from an object that is irradiated by the light emitted from the light source and configured to detect the light emitted from the object, the spectrometer including a first optical filter including a first reflector including a plurality of first sub-wavelength structures that are two-dimensionally arranged and spaced apart by a first period based on a first rule, and a second reflector including a plurality of second sub-wavelength structures that are two-dimensionally arranged and spaced apart by a second period based on a second rule, a second optical filter including a third reflector including a plurality of third sub-wavelength structures that are two-dimensionally arranged and spaced apart by a third period based on a third rule, and fourth reflector including a plurality of fourth sub-wavelength structures that are two-dimensionally arranged and spaced apart by a fourth period based on a fourth rule, and a sensor substrate including a plurality of light detectors provided to face the first optical filter and the second optical filter, respectively, and a processor configured to determine at least one of a physical property, a shape, a position, and a motion of the object based on the light detected by the spectrometer.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
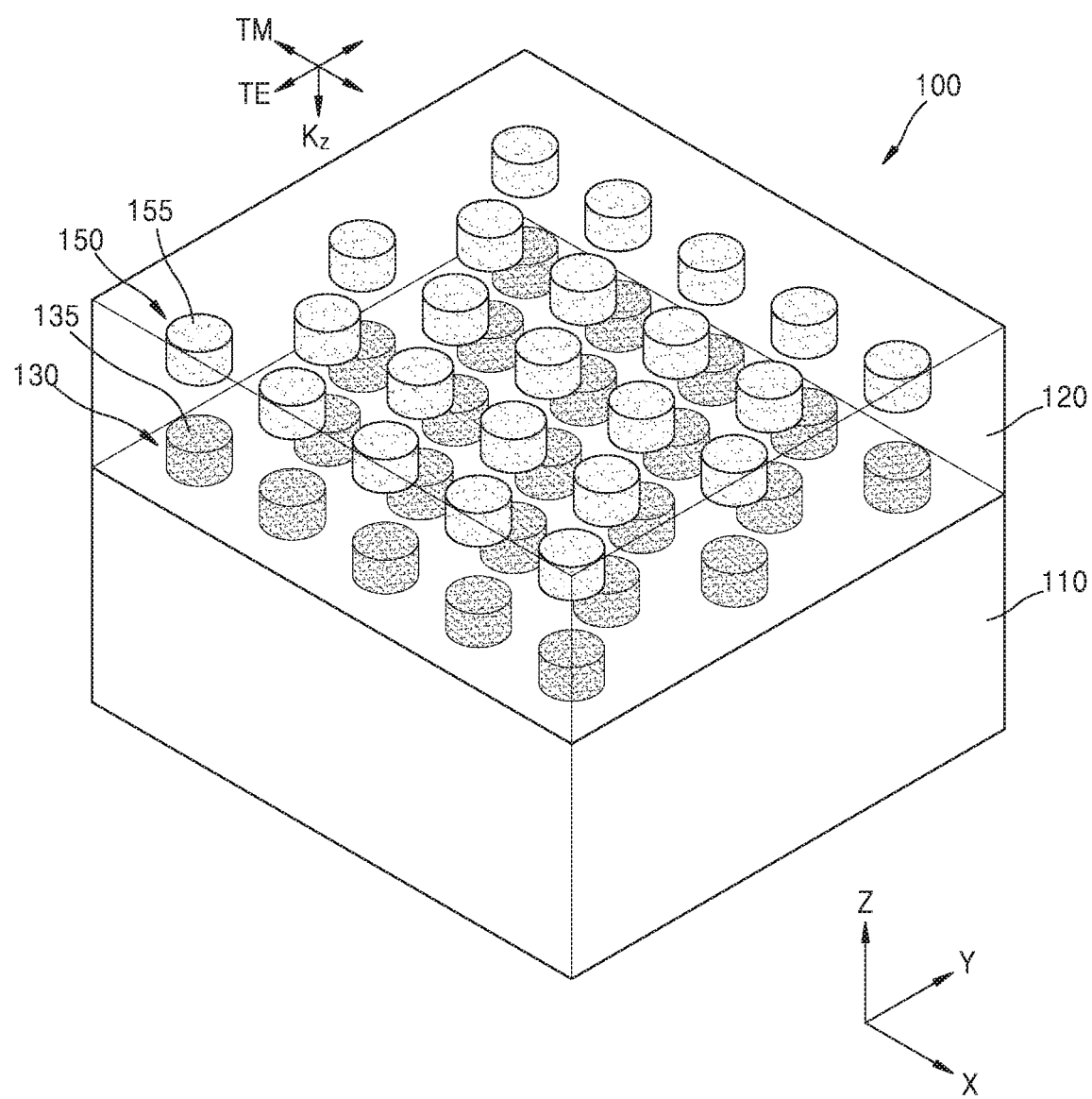
FIG. 1 is a perspective view illustrating a schematic structure of an optical filter according to an example embodiment.

Reference will now be made in detail to example embodiments, examples of which are illustrated in the accompanying drawings, wherein like reference numerals refer to like elements throughout. In this regard, example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described with reference to the accompanying drawings. Throughout the drawings, each element may be exaggerated in size for clarity and convenience of a description. Meanwhile, example embodiments are merely illustrative, and various modifications may be possible from the example embodiments.

An expression such as "above" or "on" may include not only the meaning of "immediately on in a contact manner", but also the meaning of "on in a non-contact manner".

Terms such as first, second, and the like may be used to describe various elements, but the elements should not be limited to those terms. These terms may be used for the purpose of distinguishing one element from another element.

If it is assumed that a certain part includes a certain component, the term 'including' means that a corresponding component may further include other components unless a specific meaning opposed to the corresponding component is written.

The term used in the embodiments such as "unit" or "module" indicates a unit for processing at least one function or operation, and may be implemented in hardware, software, or in a combination of hardware and software.

The connecting lines, or connectors shown in the various figures presented are intended to represent exemplary functional relationships and/or physical or logical couplings between the various elements.

Figure 2:
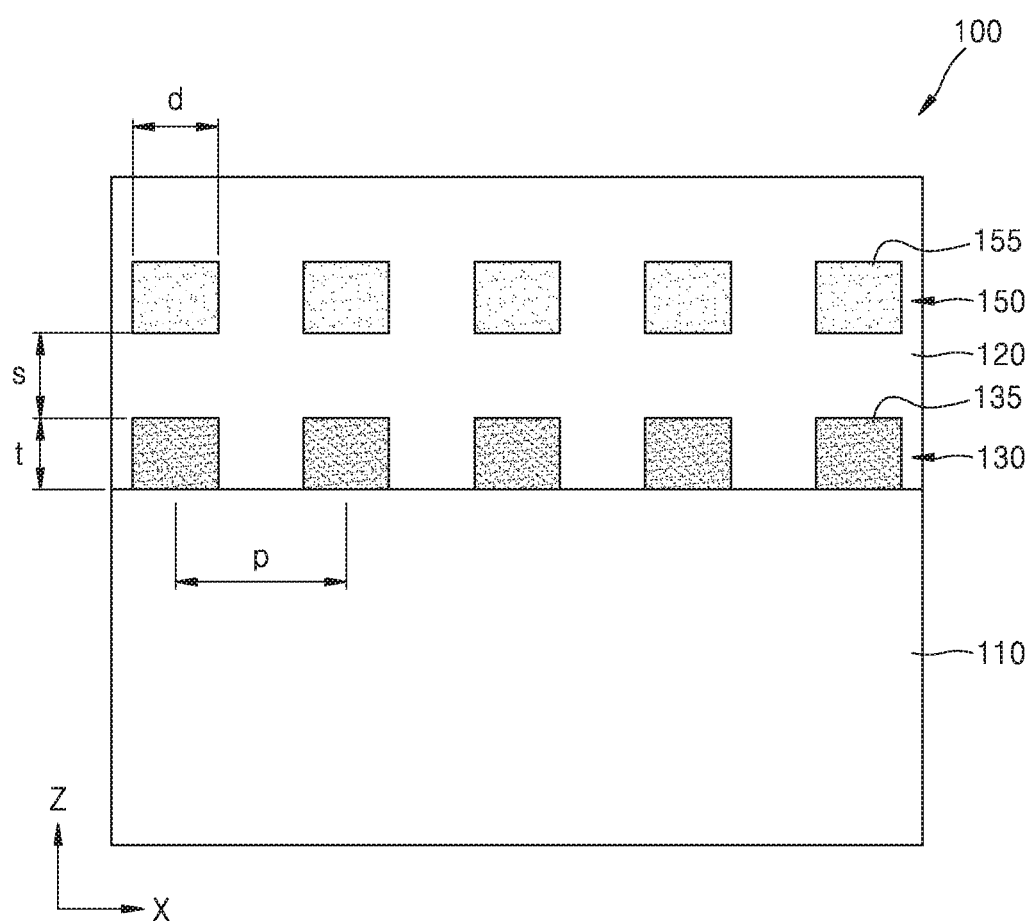
FIG. 2 is a cross-sectional view illustrating an optical filter of FIG. 1.
Figure 3:
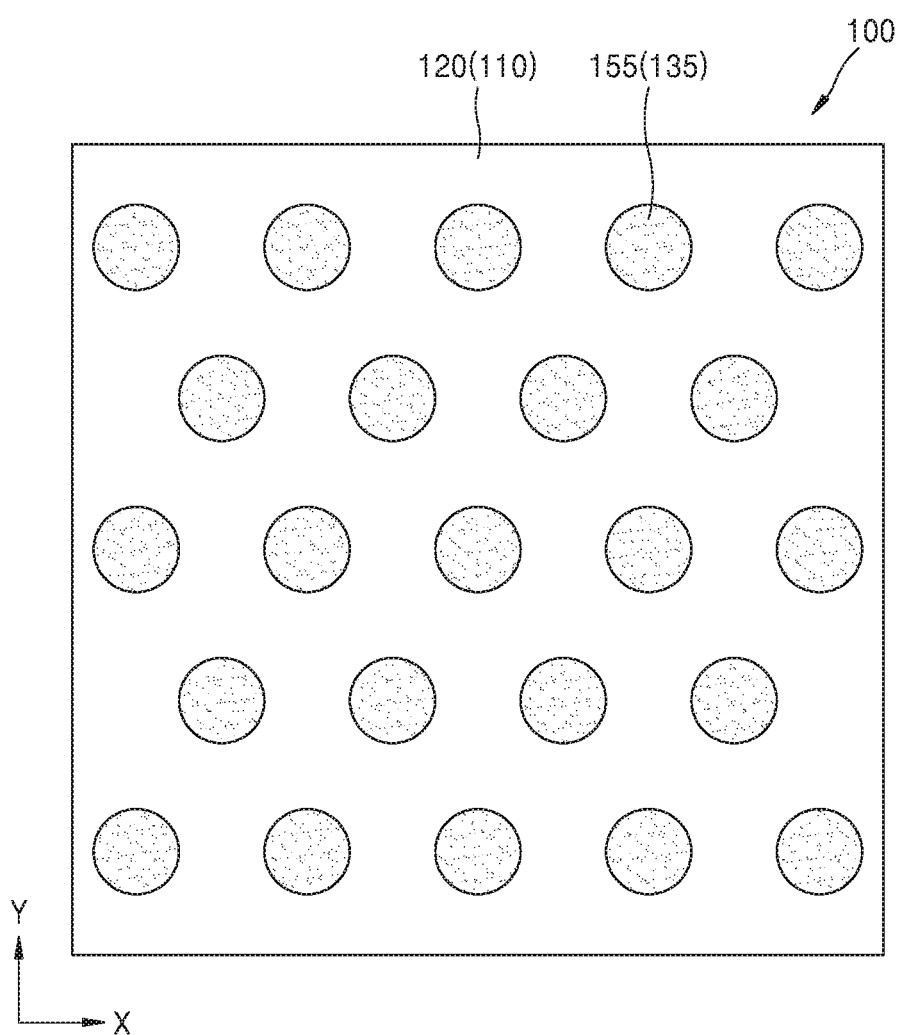
FIG. 3 is a plane view illustrating an optical filter of FIG. 1.
Figure 4:
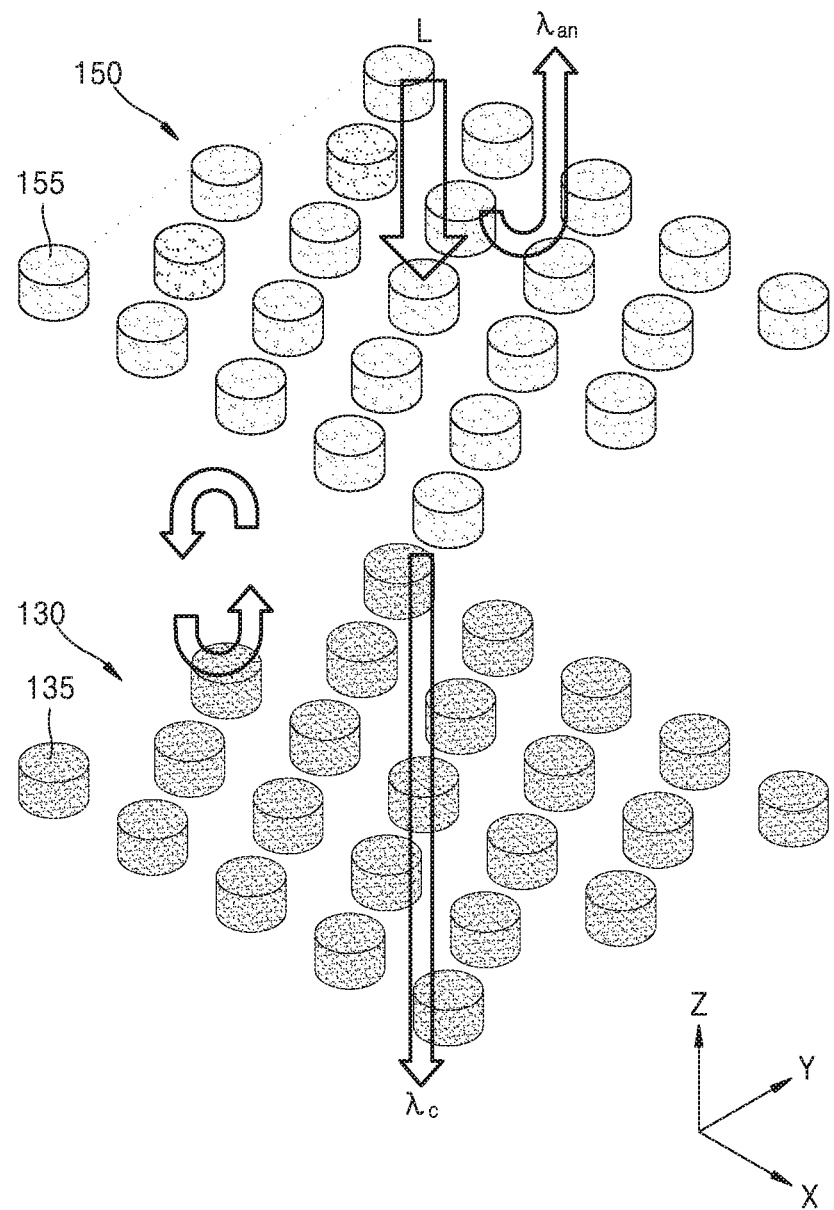
FIG. 4 illustrates light of a particular wavelength passing by two reflectors included in an optical filter according to an example embodiment.

FIG. 1 is a perspective view illustrating a schematic structure of an optical filter according to an example embodiment, FIG. 2 is a cross-sectional view illustrating the optical filter of FIG. 1, and FIG. 3 is a plane view illustrating the optical filter of FIG. 1. FIG. 4 illustrates light of a particular wavelength passing by two reflectors included in an optical filter according to an example embodiment.

An optical filter 100 may include a first reflector 130 and a second reflector 150 that are arranged separated from each other. The first reflector 130 may include a plurality of sub-wavelength structures 135 having a shape dimension of a sub-wavelength, and the second reflector 150 may include a plurality of sub-wavelength structures 155 having a shape dimension of a sub-wavelength. The plurality of first sub-wavelength structures 135 and the plurality of second sub-wavelength structures 155 are two-dimensionally arranged and spaced apart by a period according to one or more specific rules.

Referring to FIG. 2, each of the plurality of first sub-wavelength structures 135 may be spaced apart by a period p in a certain direction. The direction may be an X-axis direction as shown in FIG. 2. The first sub-wavelength structures 135 may be arranged such that three adjacent first sub-wavelength structures 135 are located at an apex of a regular triangle, for example, in a regular hexagonal lattice form or a regular triangular form. The first sub-wavelength structure 135 may have a cylindrical shape with a diameter d and a thickness t. However, this is merely an example and embodiments are not limited thereto. For example, the first sub-wavelength structure 135 may have a regular polyprism shape with a thickness t and a diagonal length d. A relationship between the diagonal length d and the thickness t is not particularly limited. For example, the first sub-wavelength structure 135 may have a disc shape with the thickness t less than the diagonal length d or a pillar shape with the thickness t greater than the diagonal length d.

The plurality of second sub-wavelength structures 155 may have the same shape as the plurality of first sub-wavelength structures 135, and may be arranged according to the same rule. That is, the plurality of second sub-wavelength structures 155 may be arranged and spaced apart by period p in the same direction to form a regular hexagonal lattice or regular triangular lattice. As shown in FIG. 3, in a plane view perpendicular to a direction in which the first reflector 130 and the second reflector 150 are separated, that is, a Z-axis direction, the first sub-wavelength structure 135 and the second sub-wavelength structure 155 may be arranged to overlap each other overall.

The first sub-wavelength structure 135 and the second sub-wavelength structure 155 may include a material having a higher refractive index than that of a peripheral material and a lower absorption coefficient, and may include a dielectric material or a semiconductor material. For example, any one of monocrystal silicon, polycrystal silicon, amorphous silicon, titanium oxide ($TiO_2$), nitride titanium (TiN), silicon nitride (SiN), and indium tin oxide (ITO) may be used. However, embodiment are not limited thereto. For example, a Group III-V semiconductor compound, such as gallium-arsenic (GaAs), gallium phosphide (GaP), or the like, may be used, and other metallic oxides may be used to form the first sub-wavelength structure 135 and the second sub-wavelength structure 155.

The optical filter 100 may further include a substrate 110 that supports the first reflector 130 and includes a material having a lower refractive index than that of the first sub-wavelength structure 135, and a peripheral material layer 120 that covers and encapsulates the first reflector 130 and the second reflector 150. The peripheral material layer 120 may include at least one of silicon oxide ($SiO_2$), a polymer-based material, for example, SU-8 or PMMA, or hydrogen silsesquioxane (HSQ).

Referring to FIG. 4, the first reflector 130 and the second reflector 150 may form a Fabry-Perot resonator.

The Fabry-Perot resonator is formed by a cavity of a space between the first reflector 130 and the second reflector 150, which have relatively high reflectivities. Light coming between the first reflector 130 and the second reflector 150 may cause constructive interference and destructive interference while traveling between the first reflector 130 and the second reflector 150 that face each other in the Z-axis direction. Light of a wavelength corresponding to a resonant wavelength $\lambda_c$ may pass through the Fabry-Perot resonator because the light satisfies a condition for constructive interference. Light of another wavelength $\lambda_{an}$ may not pass through the Fabry-Perot resonator. The Fabry-Perot resonator may be considered to have better performance as a transmission spectrum thereof shows a narrower bandwidth for the corresponding resonant wavelength $\lambda_c$. The performance of the Fabry-Perot resonator may be defined as a quality (Q) factor or a full width at half maximum (FWHM).

The optical filter 100 according to an example embodiment is a reflector of the Fabry-Perot, and has a shape dimension of a sub-wavelength and employs the first sub-wavelength structure 135 and the second sub-wavelength structure 155 having relatively high refractive index. Thus, the optical filter 100 may have relatively high reflectivities and minimizing a minimized volume. To avoid polarization dependence in transmission of light of a particular wavelength, a shape having no or minimized shape anisotropy may be employed.

The resonant wavelength $\lambda_c$ passing through the optical filter 100 is determined by an optical material and a geometric structure of the first reflector 130 and the second reflector 150. For example, the resonant wavelength $\lambda_c$ and a waveform of the transmission spectrum are determined by a refractive index n of the first sub-wavelength structure 135 and the second sub-wavelength structure 155, a refractive index $n_o$ of a peripheral material, a refractive index $n_s$ of the substrate 110, parameters d, t, and p related to a geometric structure of the first reflector 130 and the second reflector 150, respectively, and a separation distance s between the first reflector 130 and the second reflector 150 in the Z-axis direction.

The optical filter 100 according to an example embodiment shows filtering characteristics having a high degree of freedom in implementation of capabilities such as a desired wavelength band and bandwidth and no polarization dependence by using optical materials and geometric shapes of the first reflector 130 and the second reflector 150. Thus, the optical filter 100 according to an example embodiment is suitable for use as a narrow band-pass filter or in a spectrometer for showing higher spectroscopic performance in a broad wavelength band.

The shapes of the first sub-wavelength structure 135 and the second sub-wavelength structure 155 may be configured such that the optical filter 100 does not have polarization dependence in filtering of incident light. That is, the first sub-wavelength structure 135 and the second sub-wavelength structure 155 may have a cylindrical or disc shape having no shape anisotropy. The first sub-wavelength structure 135 and the second sub-wavelength structure 155 may also have a regular polyprism or regular polygonal disc shape. Thus, the optical filter 100 may have higher filtering performance with little difference between an example where light incident to the optical filter 100 in a direction $K_z$ is of TE polarization and an example where the incident light is of TM polarization.

Figure 5:
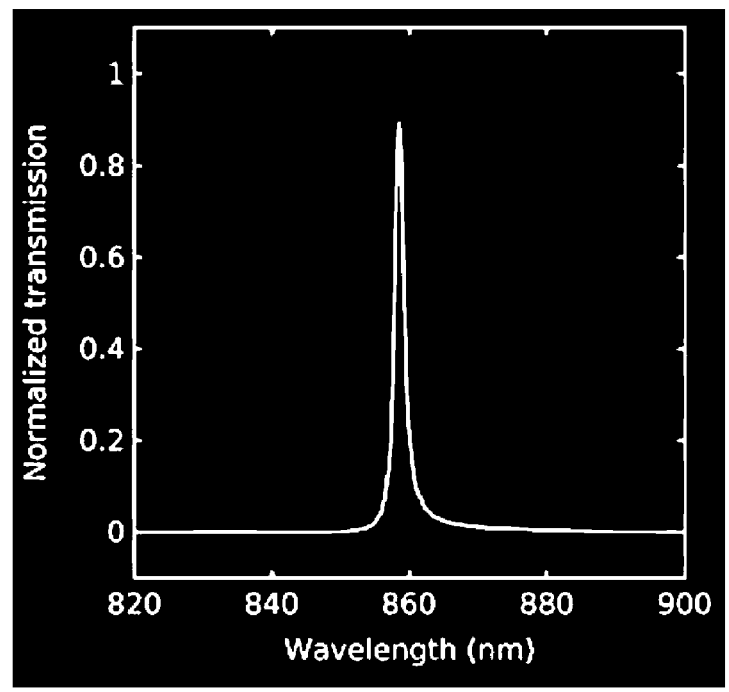
FIG. 5 is a graph showing transmission characteristics of the optical filter of FIG. 1 with respect to light of transverse electric (TE) polarization.
Figure 6:
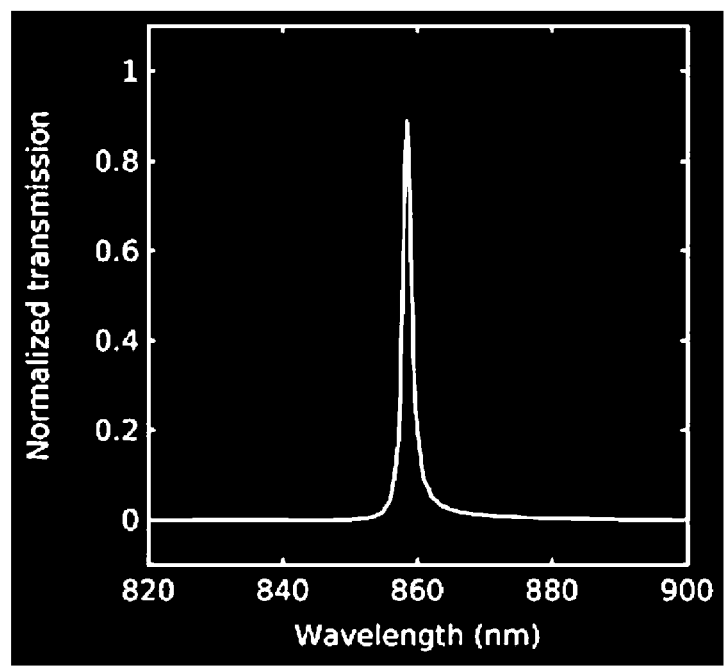
FIG. 6 is a graph showing transmission characteristics of the optical filter of FIG. 1 with respect to light of transverse magnetic (TM) polarization.

FIG. 5 is a graph showing transmission characteristics of the optical filter 100 of FIG. 1 with respect to light of TE polarization, and FIG. 6 is a graph showing transmission characteristics of the optical filter of FIG. 1 with respect to light of TM polarization.

From the graphs in FIGS. 5 and 6, little difference may be seen between transmission characteristics with respect to light of TE polarization and light of TM polarization in terms of wavelength band and waveform. Light of arbitrary polarization is indicated by a combination of two orthogonal polarizations, and thus even in the case that light of an arbitrary polarization component is incident to the optical filter 100 according to an example embodiment, transmission spectrum similar to those illustrated in FIGS. 5 and 6 may appear.

Figure 7:
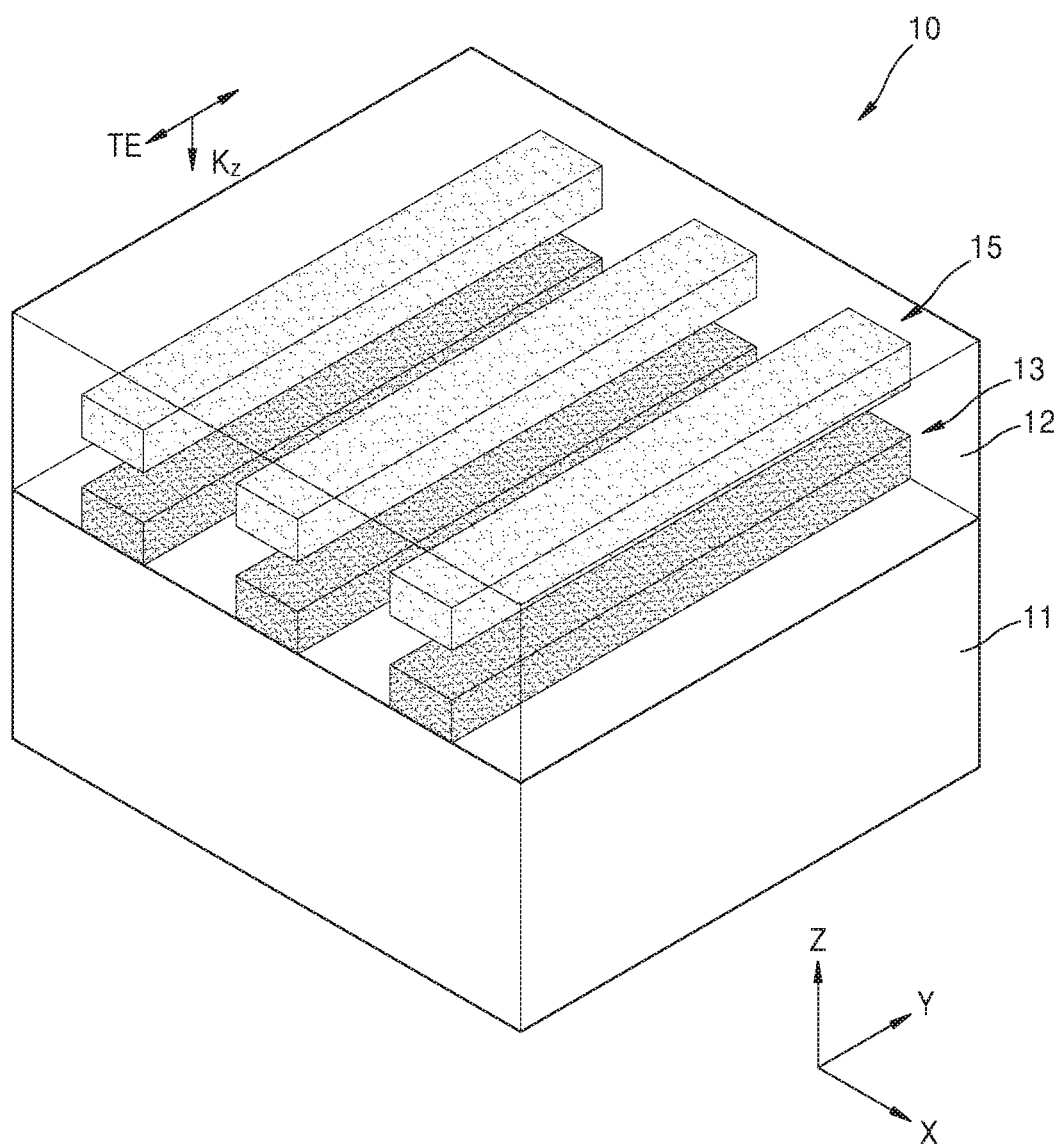
FIG. 7 is a perspective view illustrating a schematic structure of an optical filter according to a comparative example.
Figure 8:
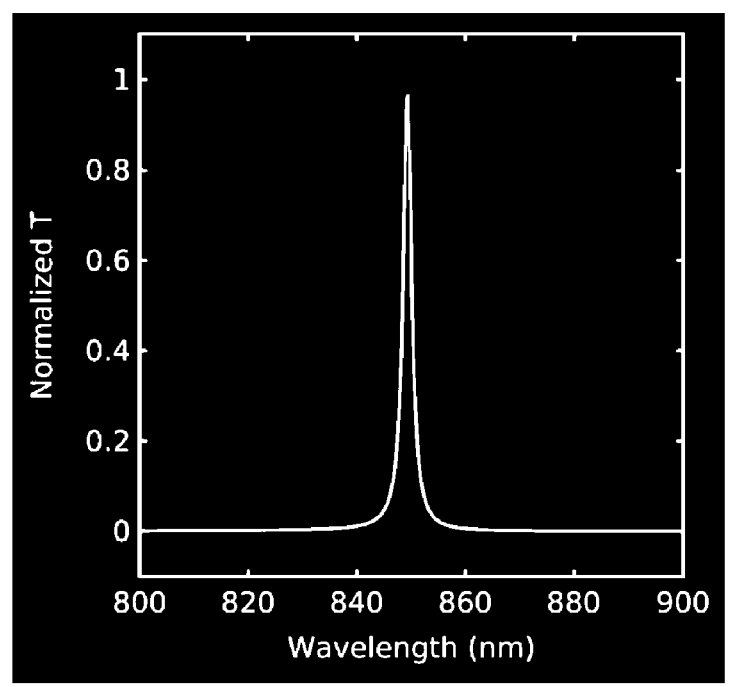
FIG. 8 is a graph showing transmission characteristics of an optical filter according to a comparative example with respect to light of TE polarization.
Figure 9:
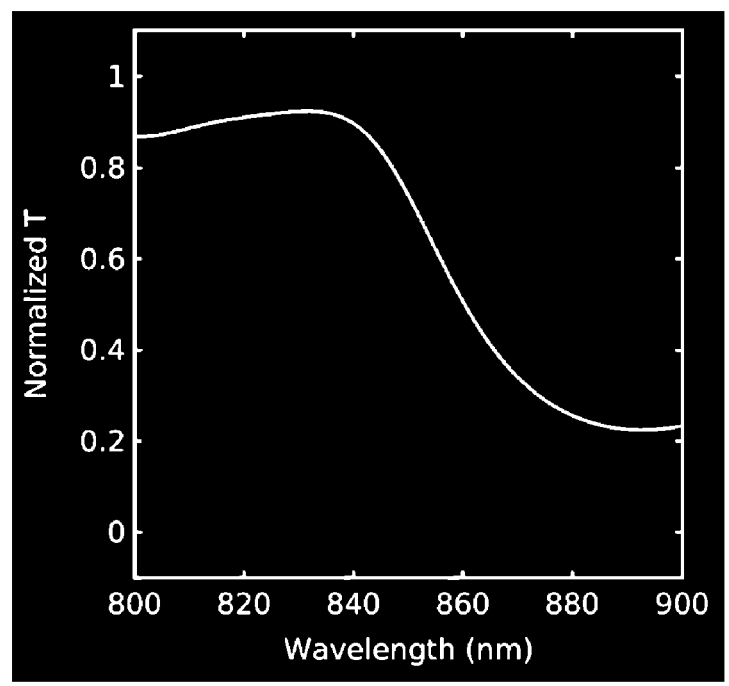
FIG. 9 is a graph showing transmission characteristics of an optical filter according to a comparative example with respect to light of TM polarization.

FIG. 7 is a perspective view illustrating a schematic structure of an optical filter according to a comparative example, FIG. 8 is a graph showing transmission characteristics of the optical filter according to a comparative example with respect to light of TE polarization, and FIG. 9 is a graph showing transmission characteristics of the optical filter according to a comparative example with respect to light of TM polarization.

An optical filter 10 according to the comparative example may include a substrate 11, a first reflector 13, and a second reflector 15, in which the first reflector 13 and the second reflector 15 may include gratings having a longitudinal direction in the X-axis direction. In this structure, for light incident in the direction $K_z$, the optical filter 10 shows designed resonant wavelength characteristics with respect to light of TE polarization, i.e., polarization that is parallel to a Y-axis direction in FIG. 7, and does not show the designed resonant wavelength characteristics with respect to light of other polarizations.

The optical filter 10 may show a relatively high transmissivity at a central wavelength and a spectrum having a good Q value with respect to light of TE polarization as illustrated in FIG. 8. With respect to light of TM polarization, a spectrum may show a different form as illustrated in FIG. 9, and may fail to perform spectroscopic function for light of a designed wavelength. Because light of arbitrary polarization is expressed by a combination of TE polarization and TM polarization, that is, light of non-polarization has a form in which TE polarization and TM polarization are uniformly distributed, the optical filter 10 experiences 50% light loss when the optical filter 10 performs a spectroscopic function with respect to incident light.

By contrast, the optical filter 100 according to an example embodiment does not suffer from light loss dependent on polarization.

Figure 10:
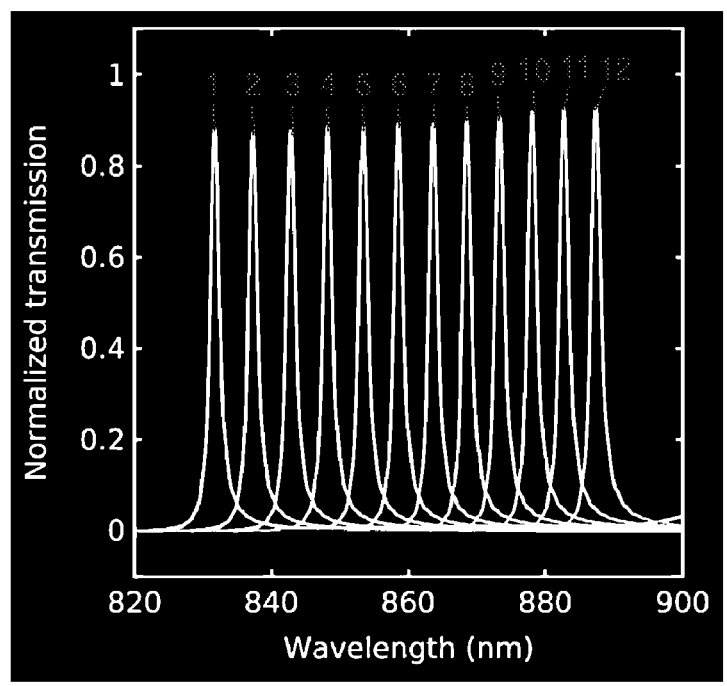
FIG. 10 is a graph showing transmission characteristics of the optical filter of FIG. 1 with respect to a change in a parameter associated with a shape.

FIG. 10 is a graph showing transmission characteristics of the optical filter of FIG. 1 with respect to a change in a parameter associated with a shape.

Graphs 1 through 12 each express transmission spectrum of a structure in which period p, thickness t, and separation distance s indicated in FIG. 2 are 450 nm, 300 nm, and 350 nm, respectively, and the diameter d is changed by a constant distance. The following table shows spectrum characteristics of each graph.

TABLE 1

| Graph # | Central Wavelength (nm) | Max T | FWHM | Q |
| --- | --- | --- | --- | --- |
| 1 | 831.7 | 0.88 | 1.57 | 530.14 |
| 2 | 837.3 | 0.88 | 1.56 | 535.12 |
| 3 | 842.8 | 0.88 | 1.56 | 539.19 |
| 4 | 848.2 | 0.89 | 1.59 | 534.87 |
| 5 | 853.4 | 0.89 | 1.61 | 531.58 |
| 6 | 858.5 | 0.89 | 1.59 | 541.17 |
| 7 | 863.6 | 0.90 | 1.58 | 547.09 |
| 8 | 868.5 | 0.90 | 1.59 | 545.83 |
| 9 | 873.3 | 0.91 | 1.62 | 537.76 |
| 10 | 878.1 | 0.92 | 1.66 | 528.58 |
| 11 | 882.7 | 0.93 | 1.68 | 525.74 |
| 12 | 887.4 | 0.93 | 1.71 | 520.22 |

Max T denotes a maximum transmittance expressed as a normalized transmittance, FWHM denotes a bandwidth of half maximum, and Q denotes a quality (Q) factor.

As the diameter d increases, spectrums tend to gradually increase in central wavelength bands thereof and have similar capabilities expressed as a maximum transmittance, a bandwidth of half maximum, and a Q value. Thus, it may be seen that transmission characteristics of a desired wavelength band may be implemented with higher performance.

The inventors have also identified from computer simulation that transmission spectrums have low dependence on an incident angle of light.

Figure 11:
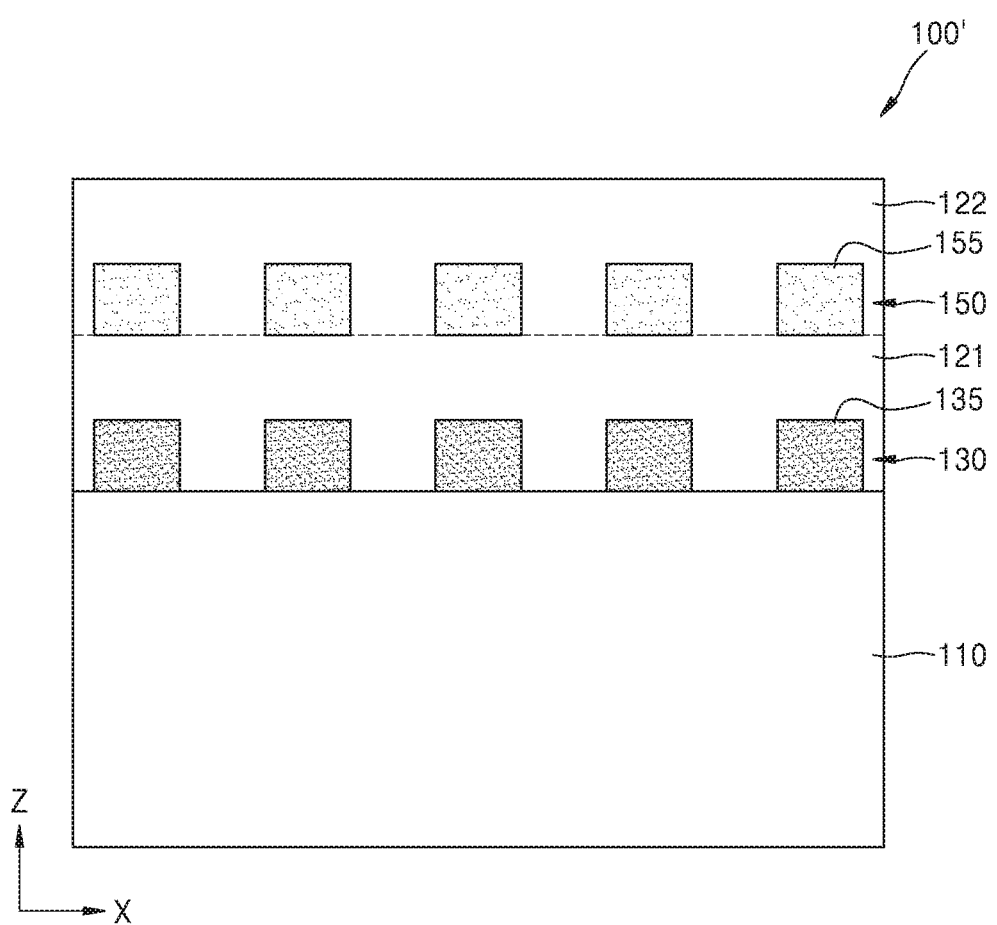
FIG. 11 is a cross-sectional view illustrating a schematic structure of an optical filter according to an example embodiment.

FIG. 11 is a cross-sectional view illustrating a schematic structure of an optical filter according to an example embodiment.

An optical filter 100', which is a modified example of the optical filter 100 of FIG. 1, is substantially the same as the optical filter 100 of FIG. 1 except for a structure of a peripheral material that covers the first sub-wavelength structure 135 and the second sub-wavelength structure 155.

The optical filter 100' may include the first reflector 130 including the plurality of first sub-wavelength structures 135 and the second reflector 150 including the plurality of second sub-wavelength structures 155. The optical filter 100' may also include a first material layer 121 that encapsulates the first reflector 130 and a second material layer 122 that encapsulates the second reflector 150.

The first material layer 121 and the second material layer 122 may include materials of the same refractive index or different refractive indices less than the refractive index of the first sub-wavelength structure 135 and the second sub-wavelength structure 155.

In the case that the first material layer 121 and the second material layer 122 include the same material, distinguishing the first material layer 121 and the second material layer 122 may be meaningful in a manufacturing process, and the optical performance of the optical filter 100' may be the same as that of the optical filter 100 of FIG. 1.

Figure 12:
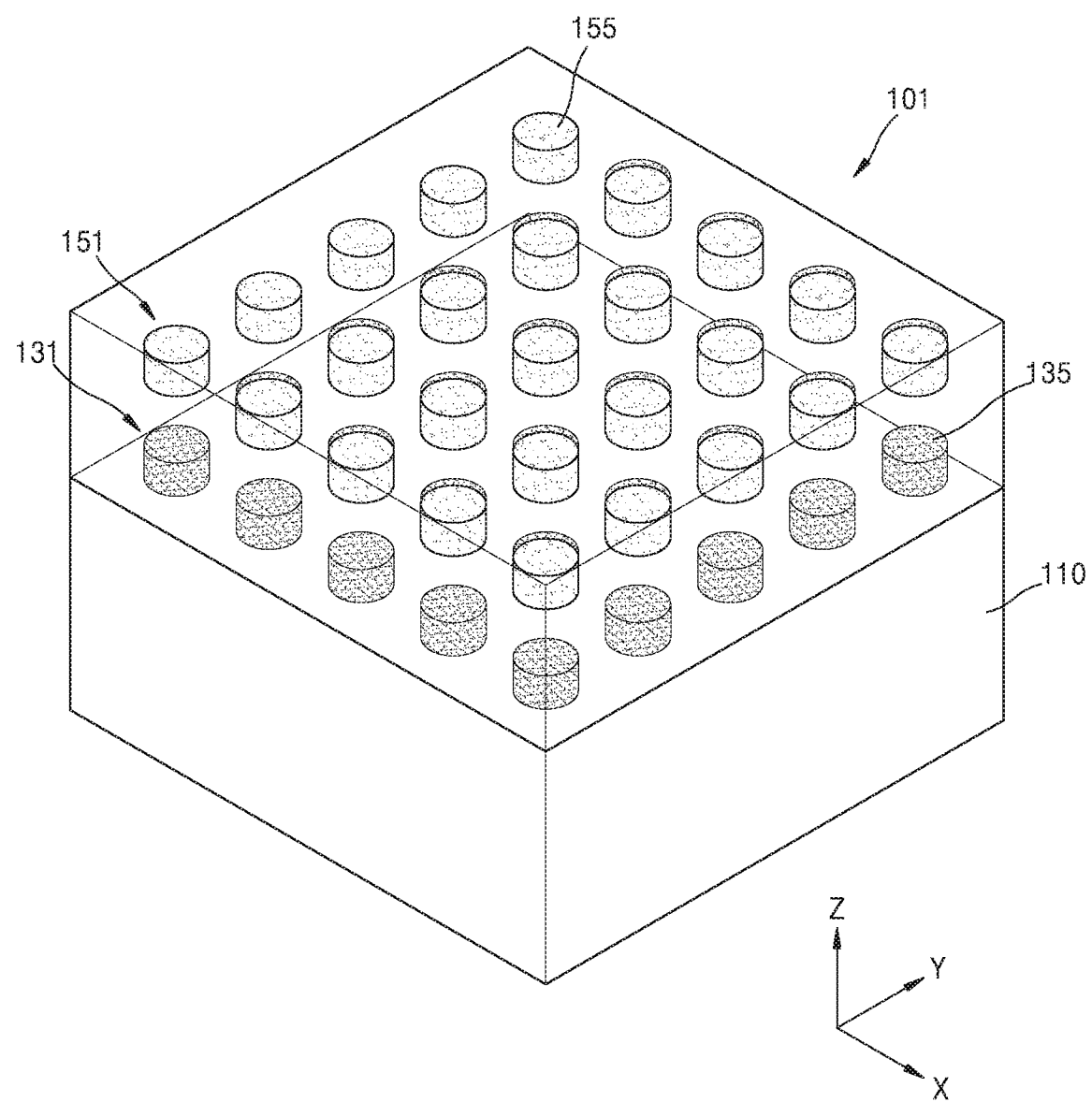
FIG. 12 is a perspective view illustrating a schematic structure of an optical filter according to an example embodiment.

FIG. 12 is a perspective view illustrating a schematic structure of an optical filter according to an example embodiment.

An optical filter 101 according to an example embodiment may be substantially the same as the optical filter 100 of FIG. 1 except for arrangement of the first sub-wavelength structure 135 and the second sub-wavelength structure 155.

The optical filter 101 may include the first reflector 131 including the plurality of first sub-wavelength structures 135 and the second reflector 151 including the plurality of second sub-wavelength structures 155. The first sub-wavelength structures 135 and the second sub-wavelength structures 155 may be arranged and spaced apart by a particular period in a direction and in square lattice forms, respectively. That is, the plurality of first sub-wavelength structures 135 and the plurality of second sub-wavelength structures 155 may be arranged and spaced apart by the same period along two directions, the direction X-axis and the direction Y-axis, respectively.

Figure 13:
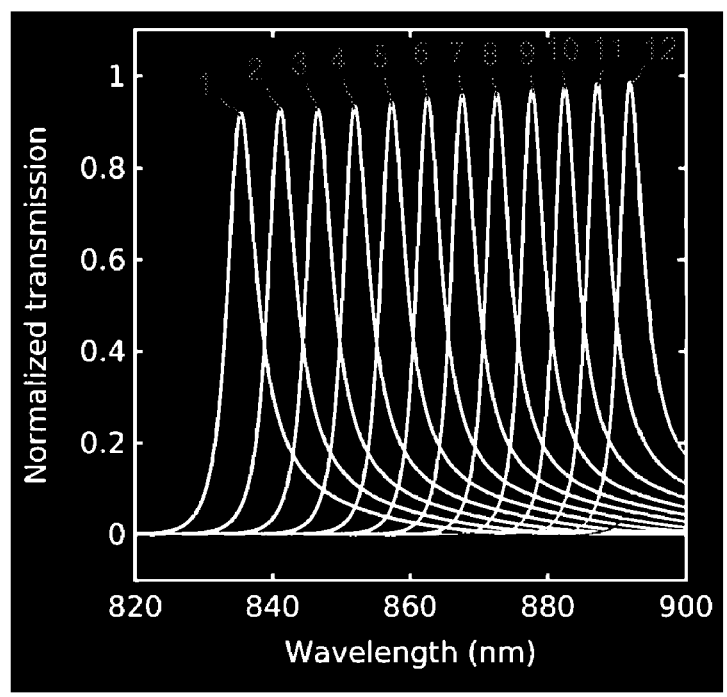
FIG. 13 is a graph showing transmission characteristics of an optical filter of FIG. 12 with respect to a change in a parameter associated with a shape.

FIG. 13 is a graph showing transmission characteristics of the optical filter of FIG. 12 with respect to a change in a parameter associated with a shape.

Like the graphs shown in FIG. 10, graphs 1 through 12 each express a transmission spectrum of a structure in which p, t, and s indicated in FIG. 2 are 450 nm, 300 nm, and 350 nm, respectively, and the diameter d is changed by a constant distance.

Compared to in the graphs shown in FIG. 10, in the graphs shown in FIG. 13, a central wavelength with respect to a change in the diameter d is similar and an FWHM is larger.

From the graph in FIG. 13, it may be seen that a transmission spectrum of a desired bandwidth may be obtained by changing arrangement of the first sub-wavelength structures 135 and the second sub-wavelength structures 155.

Figure 14:
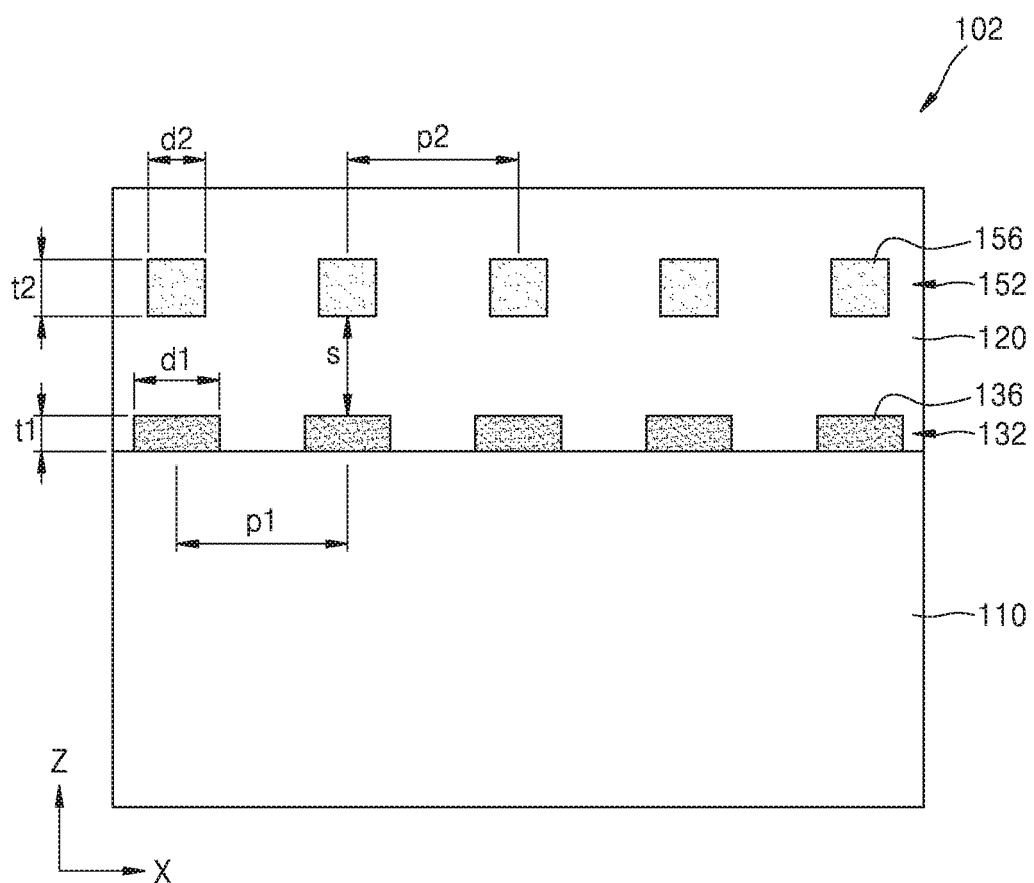
FIG. 14 is a cross-sectional view illustrating a schematic structure of an optical filter according to an example embodiment.
Figure 15:
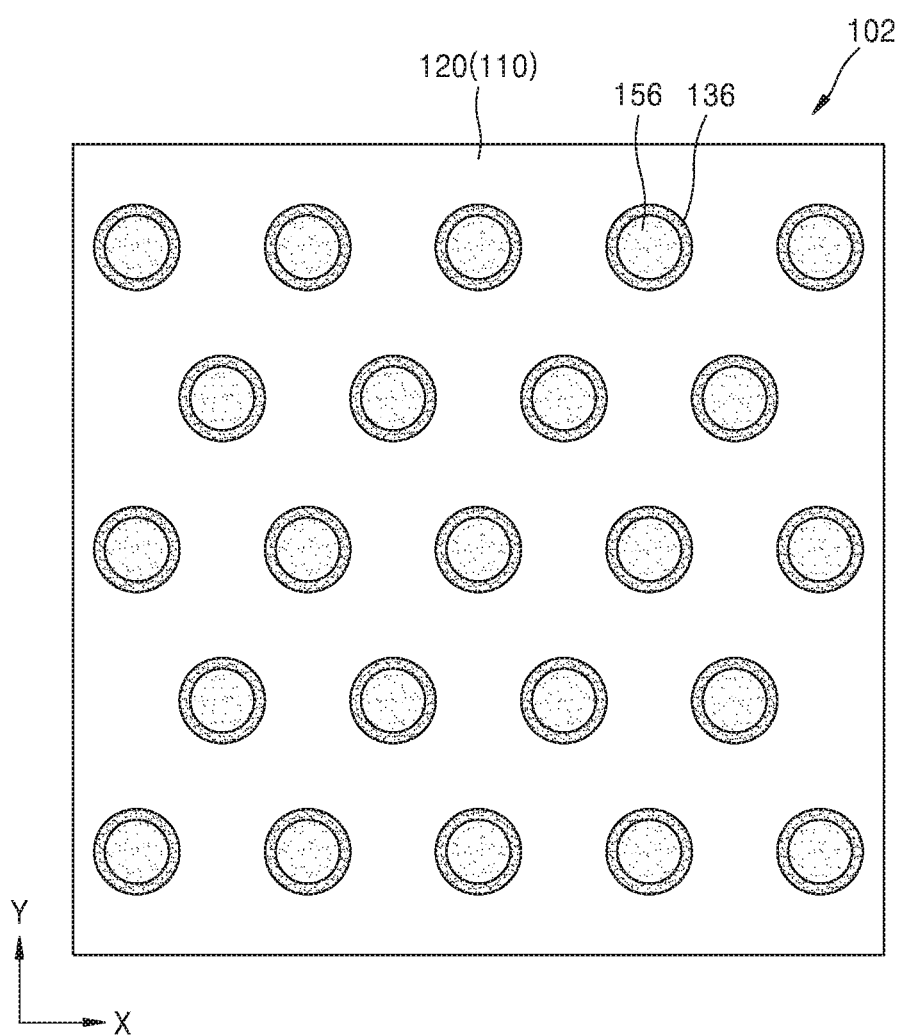
FIG. 15 is a plane view illustrating the optical filter of FIG. 14.

FIG. 14 is a cross-sectional view illustrating a schematic structure of an optical filter according to an example embodiment, and FIG. 15 is a plane view illustrating the optical filter of FIG. 14.

An optical filter 102 may include a first reflector 132 and a second reflector 152 in which the first reflector 132 may include a plurality of first sub-wavelength structures 136 and the second reflector 152 may include a plurality of second sub-wavelength structures 156.

The optical filter 102 according to an example embodiment is different from the optical filter 100 of FIG. 1 in that arrangement rules and/or shapes of the plurality of first sub-wavelength structures 136 are different from those of the plurality of second sub-wavelength structures 156.

The first sub-wavelength structures 136 may be arranged and spaced apart by a period of p1 in a direction and have a cylindrical shape with a diameter d1 and a thickness of t1.

The second sub-wavelength structures 156 may be arranged and spaced apart by a period of p2 in a direction and have a cylindrical shape with a diameter d2 and a thickness of t2.

As shown in FIG. 15, in a plane view perpendicular to a direction in which the first reflector 132 and the second reflector 152 are separated, the first sub-wavelength structure 136 and the second sub-wavelength structure 156 may be arranged to overlap each other. The first sub-wavelength structures 136 and the second sub-wavelength structures 156 may be arranged in a regular hexagonal lattice form or a regular triangular form, respectively.

As such, the optical filter 102 may have a high degree of freedom in parameters for designing transmission spectrum, when compared to the optical filter 100 of FIG. 1. The desired transmission spectrum may be implemented using parameters of p1, p2, d1, d2, t1, t2, and s as well as a refractive index of each material. Although it is illustrated that arrangement in the regular hexagonal lattice form or the regular triangular form is applied to the first reflector 132 and the second reflector 152, embodiments are not limited thereto. For example, the first reflector 132 and the second reflector 152 may be arranged in the square form or other forms.

Figure 16:
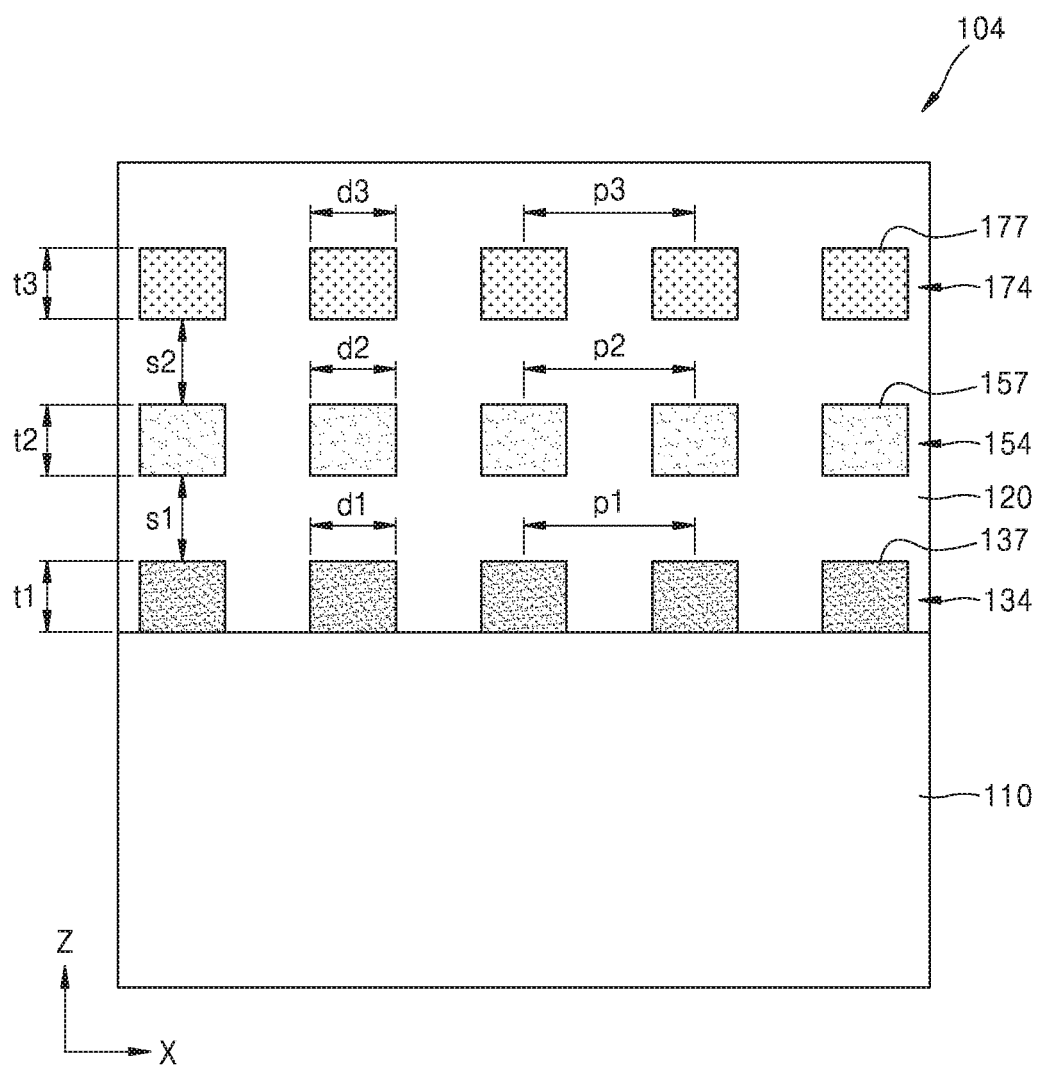
FIG. 16 is a cross-sectional view illustrating a schematic structure of an optical filter according to an example embodiment.
Figure 17:
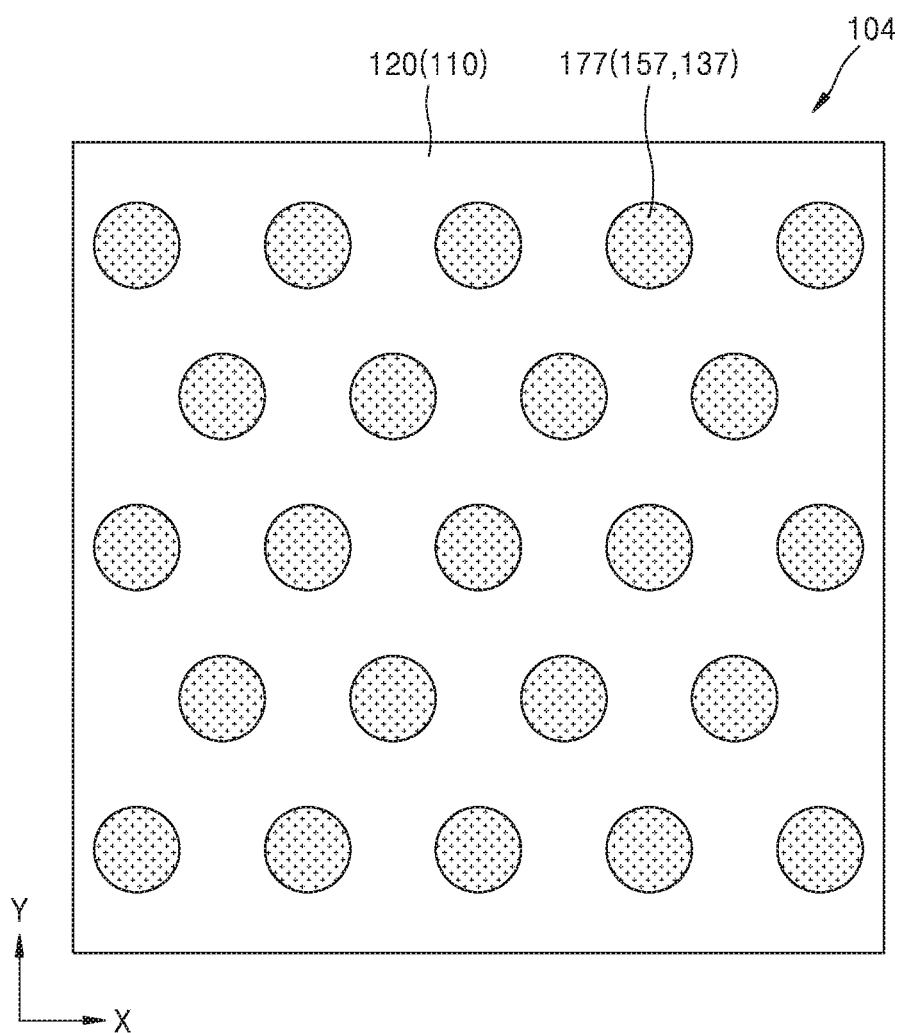
FIG. 17 is a plane view illustrating the optical filter of FIG. 16.

FIG. 16 is a cross-sectional view illustrating a schematic structure of an optical filter according to an example embodiment, and FIG. 17 is a plane view illustrating the optical filter of FIG. 16.

An optical filter 104 may include a first reflector 134, a second reflector 154, and a third reflector 174. The first filter 134 may include a plurality of first sub-wavelength structures 137, the second reflector 154 may include a plurality of second sub-wavelength structures 157, and the third reflector 174 may include a plurality of third sub-wavelength structures 177.

The optical filter 104 according to the example embodiment may be different from the optical filter 100 of FIG. 14 in that the optical filter 104 includes three reflectors.

The first sub-wavelength structures 137 may be arranged and spaced apart by a period of p1 in a direction and have a cylindrical shape with a diameter d1 and a thickness of t1. The second sub-wavelength structures 157 may be arranged and spaced apart by a period of p2 in a direction and have a cylindrical shape with a diameter d2 and a thickness of t2. The third sub-wavelength structures 177 may be arranged and spaced apart by period of p3 in a direction and have a cylindrical shape with a diameter d3 and a thickness of t3. A separation distance between the first reflector 134 and the second reflector 154 may be s1, and a separation distance between the second reflector 154 and the third reflector 174 may be s2.

While it is illustrated in the drawing that the first sub-wavelength structure 137, the second sub-wavelength structure 157, and the third sub-wavelength structure 177 have the same size and shape, they may also have different dimensions without being limited thereto. Arrangement is also illustrated in the regular hexagonal lattice form or the regular triangular lattice form, but may also be in the square form, and the first sub-wavelength structure 137, the second sub-wavelength structure 157, and the third sub-wavelength structure 177 may have two or more different arrangement forms.

Figure 18:
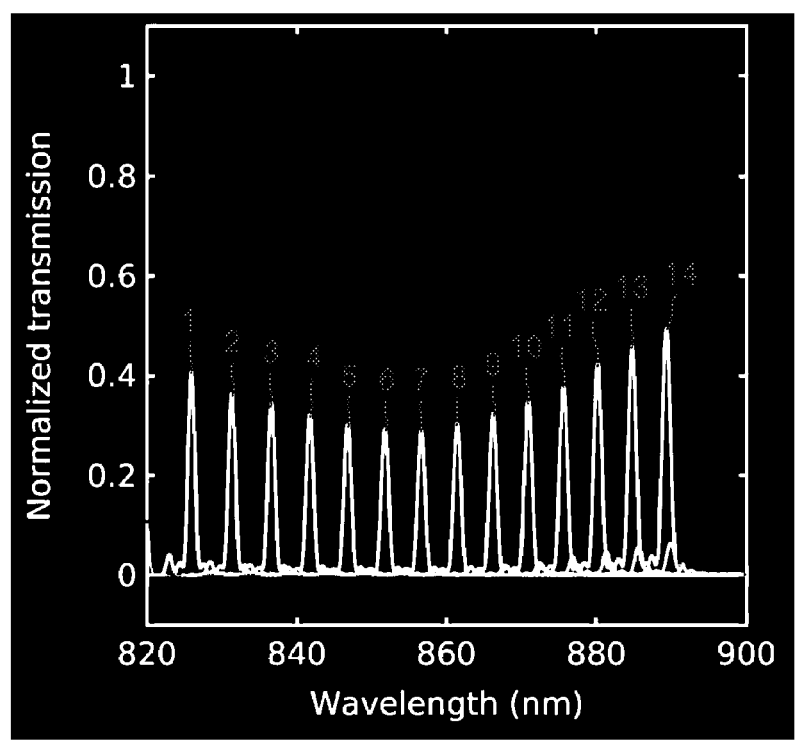
FIG. 18 is a graph showing transmission characteristics of the optical filter of FIG. 16 with respect to a change in a parameter associated with a shape.

FIG. 18 is a graph showing transmission characteristics of the optical filter of FIG. 16 with respect to a change in a parameter associated with a shape.

Graphs 1 through 14 each express a transmission spectrum of a structure in which the first sub-wavelength structure 137, the second sub-wavelength structure 157, and the third sub-wavelength structure 177 have the same-size cylindrical shape, and a period p, a thickness t, and a separation distance s are 450 nm, 300 nm, and 350 nm, respectively, and the diameter d is changed by a constant distance.

The following table shows spectrum characteristics of each graph.

TABLE 2

| Graph # | Central Wavelength (nm) | Max T | FWHM | Q |
|---|---|---|---|---|
| 1 | 825.9 | 0.41 | 1.06 | 781.65 |
| 2 | 831.3 | 0.37 | 1.07 | 775.89 |
| 3 | 836.6 | 0.35 | 1.09 | 768.08 |
| 4 | 841.7 | 0.32 | 1.11 | 759.48 |
| 5 | 846.8 | 0.30 | 1.13 | 751.90 |
| 6 | 851.8 | 0.29 | 1.15 | 743.80 |
| 7 | 856.6 | 0.29 | 1.16 | 739.18 |
| 8 | 861.4 | 0.31 | 1.17 | 737.14 |
| 9 | 866.2 | 0.33 | 1.17 | 742.32 |
| 10 | 870.9 | 0.35 | 1.18 | 737.81 |
| 11 | 875.6 | 0.38 | 1.19 | 737.82 |
| 12 | 880.2 | 0.42 | 1.20 | 733.60 |
| 13 | 884.8 | 0.46 | 1.23 | 721.17 |
| 14 | 889.4 | 0.50 | 1.29 | 690.33 |

Max T denotes a maximum transmittance expressed as a normalized transmittance, FWHM denotes a bandwidth of half maximum, and Q denotes a Q factor.

As the diameter d increases, spectrums tend to gradually increase in central wavelength bands thereof and have similar capabilities expressed as a bandwidth of half maximum and a Q value.

Compared to the graphs shown in FIG. 10 and Table 1, in the graphs shown in FIG. 18 and Table 2, a central wavelength with respect to a change in the diameter d is similar, the maximum transmittance is smaller, but the Q value is greater.

Thus, it may be seen that by using three or more reflectors, for example, the first reflector 134, the second reflector 154, and the third reflector 174, a sharper spectroscopic function may be enabled. Moreover, by combining shape dimensions and periods of the respective sub-wavelength structures, for example, the first sub-wavelength structure 137, the second sub-wavelength structure 157, and the third sub-wavelength structure 177, various transmission spectrums may be obtained.

Figure 19:
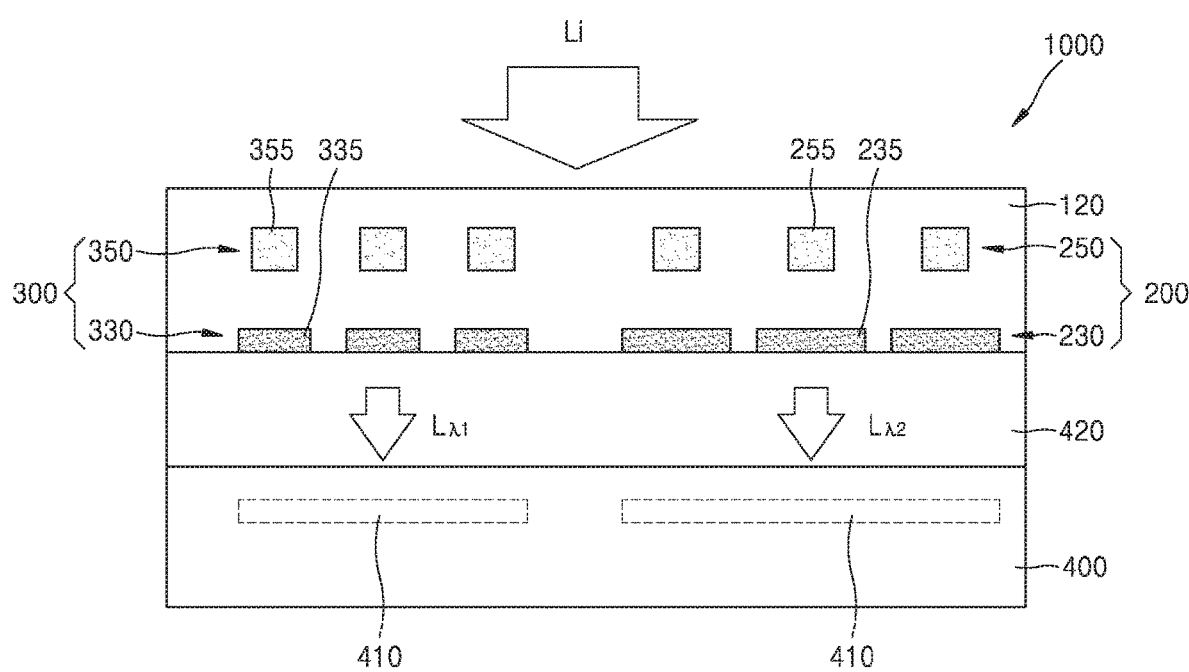
FIG. 19 is a cross-sectional view illustrating a schematic structure of a spectrometer according to an example embodiment.

FIG. 19 is a cross-sectional view illustrating a schematic structure of a spectrometer according to an example embodiment.

A spectrometer 1000 may include a plurality of light detection elements 410 and a first optical filter 200 and a second optical filter 300 which are arranged to face the plurality of light detection elements 410. The first optical filter 200 and the second optical filter 300 may have filtering characteristics that respectively pass through light of different wavelengths $L_{\lambda 1}$ and $L_{\lambda 2}$.

The plurality of light detection elements 410 may be provided inside a sensor substrate 400, and the first optical filter 200 and the second optical filter 300 may be arranged on the sensor substrate 400 facing the plurality of light detection elements 410, respectively. A spacer layer 420 may be arranged between the sensor substrate 400 and the first optical filter 200 and the second optical filter 300. The spacer layer 420 may support the first optical filter 200 and the second optical filter 300, and may be formed of the material of the substrate 110 in the foregoing example embodiments. For example, the spacer layer 420 may include a material having a lower refractive index than that of the first optical filter 200 and the second optical filter 300.

As the plurality of light detection elements 410, for example, a photodiode, a phototransistor, a charge-coupled device (CCD), etc. may be used.

The first optical filter 200 may include a first reflector 230 and a second reflector 250 that are arranged separated from each other by a particular distance. The first reflector 230 may include a plurality of first sub-wavelength structures 235 that are periodically and two-dimensionally arranged according to a first rule, and the second reflector 250 may include a plurality of second sub-wavelength structures 255 that are periodically and two-dimensionally arranged according to a second rule.

The first rule, the second rule, the distance between the first reflector 230 and the second reflector 250, and shapes and sizes of the first sub-wavelength structures 233 and the second sub-wavelength structures 255 may be determined to transmit light of a wavelength $L_{\lambda 1}$ of incident light Li.

The second optical filter 300 may include a third reflector 330 and a fourth reflector 350 that are arranged separated from each other by a particular distance. The third reflector 330 may include a plurality of third sub-wavelength structures 335 that are periodically and two-dimensionally arranged according to a third rule, and the fourth reflector 350 may include a plurality of fourth sub-wavelength structures 355 that are periodically and two-dimensionally arranged according to a fourth rule.

The third rule, the fourth rule, the distance between the third reflector 330 and the fourth reflector 350, and shapes and sizes of the third sub-wavelength structures 335 and the fourth sub-wavelength structures 355 may be determined to transmit light of a wavelength $L_{\lambda 2}$ of the incident light Li.

Although the first optical filter 200 and the second optical filter 300 passing through light of different wavelength bands are illustrated in FIG. 19, the spectrometer 1000 may further include an additional optical filter passing through light of a different wavelength band, considering a wavelength band included in light which is a target for the spectroscopic function, based on a detailed purpose of the spectrometer 1000. The spectrometer 1000 may further include another optical filter for blocking light of a wavelength band that is not a target for the spectroscopic function.

The sensor substrate 400 and the first optical filter 200 and the second optical filter 300 may be formed monolithically. After the plurality of light detection elements 410 are formed inside the sensor substrate 400 and the spacer layer 420 is formed on the sensor substrate 400, the plurality of first sub-wavelength structures 235 and the plurality of third sub-wavelength structures 335 may be formed on the spacer layer 420, and then the plurality of second sub-wavelength structures 255 and the plurality of fourth sub-wavelength structures 355 may be formed. A structure in which the first optical filter 200 and the second optical filter 300 are formed on the spacer layer 420 may be adhered to the sensor substrate 400.

For simpler processing, the plurality of first sub-wavelength structures 235 included in the first reflector 230 and the plurality of third sub-wavelength structures 335 included in the third reflector 330 may be formed to have the same thickness, and the plurality of second sub-wavelength structures 255 included in the second reflector 250 and the plurality of fourth sub-wavelength structures 355 included in the fourth reflector 350 may be formed to have the same thickness, and the space between the first reflector 230 and the second reflector 250 may be the same as the space between the third reflector 330 and the fourth reflector 350.

In this structure, main parameters related to transmission characteristics of the first optical filter 200 and the second optical filter 300 may be diameters of the cylindrical shape and arrangement periods in the respective reflectors, that is, the first reflector 230, the second reflector 250, the third reflector 330, and the fourth reflector 350, and a proper combination of those values may be set considering the transmission wavelengths λ1 and λ2 to be implemented and an FWHM.

The above-described spectrometer 1000 may be used in various optical apparatuses, sensors, etc. For example, the spectrometer 1000 may be used in a gas sensor, a chemical sensor, a skin sensor, a food sensor etc. The sensor may sense types of several molecules existing in the air and detect a density of the molecules by using a spectrometer and may use a feature in which a transmittance varies from wavelength to wavelength due to the type and the density of the molecule.

The spectrometer 1000 may be used as an inspection apparatus for an object. For example, the spectrometer 1000 may be used as an apparatus that analyzes a position and a shape of the object or analyzes an element or a physical property of the object, freshness of food, etc.

Figure 20:
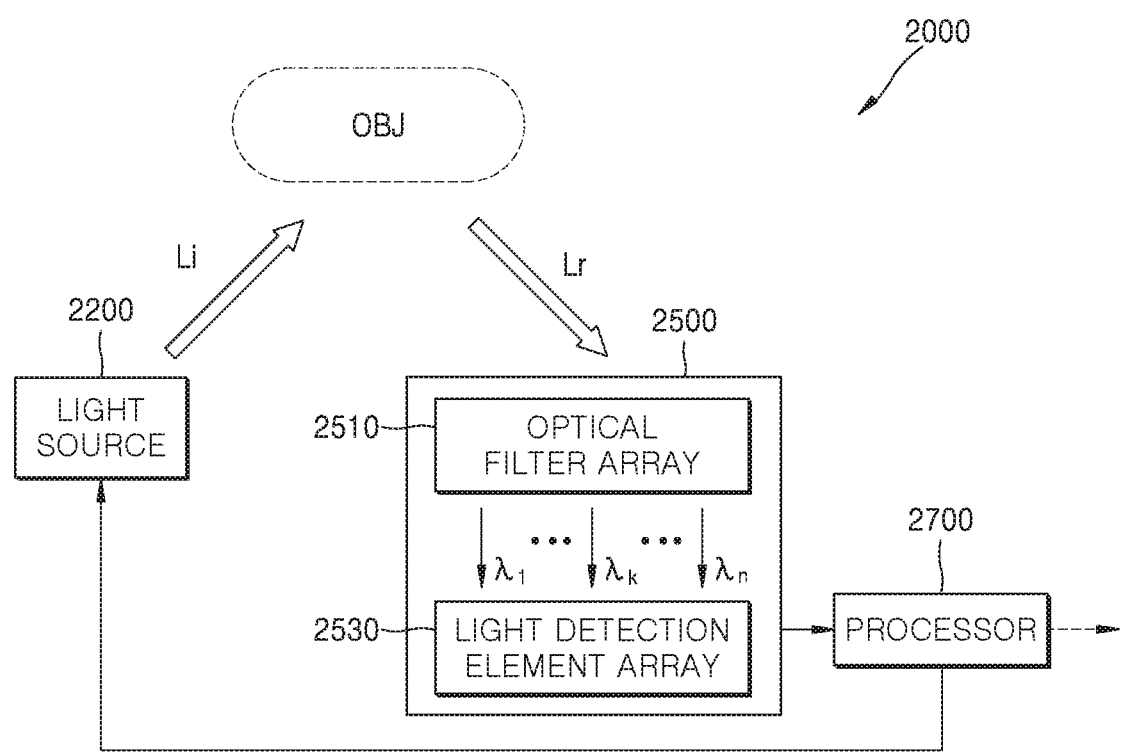
FIG. 20 is a block diagram illustrating a schematic structure of an electronic apparatus according to an example embodiment.

FIG. 20 is a block diagram illustrating a schematic structure of an electronic apparatus 2000 according to an example embodiment.

The electronic apparatus 2000 may include a light source 2200 that radiates light to an object OBJ, a spectrometer 2500 that is arranged on a path of light coming from the object OBJ due to the light irradiated on the OBJ from the light source 2200, and a processor 2700 that analyzes at least one of a physical property, a shape, a position, or a motion of the object by analyzing light detected by the spectrometer 2500 according to, for example, Raman spectroscopy.

The spectrometer 2500 may include an optical filter array 2510 and a light detection element array 2530. The optical filter array 2510 may include a plurality of optical filters showing filtering characteristics having no polarization dependence. Thus, higher spectroscopic performance may be obtained for light of non-polarization in which a transmittance is high and an FWHM is small in a desired wavelength band.

The operation of the electronic apparatus 2000 may be described using the Raman spectroscopy as below.

The Raman spectroscopy uses a shift shape of an energy state when light of a single wavelength is scattered through interaction with molecular vibration of a material of the object OBJ.

The light Li irradiated from the light source 2200 may serve as exciting light for the object OBJ. The light source 2200 may provide light of a single wavelength suitable for detecting a wavelength shift. For example, laser light of a single wavelength in the form of a pulse may be provided. That is, light is scattered by a molecular structure in the object OBJ. Light Lr emitted from the object OBJ is scattered light that is wavelength-converted, from the light Li radiated by the light source 2200, by a molecular structure in the object OBJ, and the scattered light may include various spectrums having different degrees of wavelength conversion according to a molecular state in the object OBJ. This is called a Raman signal.

Once the Raman signal is incident to the spectrometer 2500, each optical filter of the optical filter array 2510 transmits light of a corresponding wavelength, and the transmitted light is incident to a light detection element of the light detection element array 2530, and a magnitude of the transmitted light is detected.

The detected Raman signal is analyzed by the processor 2700. The Raman signal may include a wavelength shift with respect to a wavelength of the incident light, in which the wavelength shift is an energy shift and may include information associated with molecular vibration of a material, e.g., information about a molecular structure, a bonding form, etc., and information about a functional group. A Raman peak may appear differently on the Raman spectrum depending on a molecular element of the object OBJ, and for example, whether or not glucose, urea, ceramide, keratin, collagen, etc., is included in transcellular fluid or blood of the object OBJ may be analyzed. As such, the processor 2700 may analyze a distribution of a material in the object OBJ from light, i.e., the Raman signal, coming from the object OBJ.

The electronic apparatus 2000 may be used as a three-dimensional (3D) optical sensors, i.e., an apparatus for sensing a shape, a motion, etc., of the object OBJ, as will be described below in detail.

The light source 2200 may irradiate the light Li including a plurality of wavelength bands to the object OBJ. The light Li may be irradiated to scan the object OBJ, and to this end, an optical element such as a beam steering device may be further arranged between the light source 2200 and the object OBJ.

The light Lr reflected from the object OBJ may be received by the spectrometer 2500. The spectrometer 2500 may include the optical filter array 2510 that transmits light of a corresponding wavelength to detect light of a plurality of wavelength bands irradiated from the light source 2200.

The processor 2700 may analyze information about the object OBJ from a signal for light of a plurality of wavelengths detected by the spectrometer 2500. For example, the processor 2700 may identify a 3D shape of the object OBJ by performing an operation for measurement of a time of flight (ToF) from the detected optical signal. The shape of the object OBJ may also be identified using direct time measurement or an operation using correlation.

In the case that the light source 2200 irradiates a plurality of lights of different wavelengths and the spectrometer 2500 detects the reflected light Lr from the object OBJ, the speed of scanning the object OBJ may be improved and information about the position, shape, etc., of the object OBJ may be obtained at higher speed.

While it has been described as an example that the electronic apparatus 2000 analyzes a physical property of the object OBJ according to Raman analysis that detects a wavelength shift caused by the object OBJ or analyzes a position or a shape of the object OBJ by analysis of light reflected from the object OBJ, embodiments are not limited thereto.

The processor 2700 may control the overall operation of the electronic apparatus 2000 and may perform power supply control, pulse wave (PW) or continuous wave (CW) generation control, and so forth with respect to the light source 2200.

The electronic apparatus 2000 may include a memory in which a program needed for an operation and other data are stored.

An operation result in the processor 2700, that is, information about the shape, position, and physical property of the object OBJ, may be transmitted to another unit. For example, the information may be transmitted to an autonomous driving device that needs information about a 3D shape, operation, and position of the object OBJ or to a medical apparatus that uses physical property information of the object OBJ, e.g., biometric information. The other unit to which the operation result is transmitted may be a display device or a printer. In addition, the other unit may also be, but is not limited to, a smart phone, a cellular phone, a personal digital assistant (PDA), a laptop, a personal computer (PC), and other mobile or non-mobile computing devices.

The above-described optical filter has no polarization dependence, and thus may have filtering characteristics having little light loss caused by polarization of incident light.

The optical filter may also have higher transmission characteristics in various central wavelengths due to high degrees of freedom in implementation of transmission wavelength band and FWHM.

The optical filter may be used in the spectrometer, and may have higher spectroscopic performance with a miniaturized structure, and may be favorable to application to various optical apparatuses.

While the optical filter, the spectrometer, and the optical apparatus have been shown and described in connection with the example embodiments, it will be apparent to those of ordinary skill in the art that modifications and variations can be made without departing from the spirit and scope of the example embodiments as defined by the appended claims. Descriptions of features or aspects of example embodiments should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An optical filter comprising:
   a first reflector comprising a plurality of first sub-wavelength structures that are two-dimensionally arranged in a horizontal direction and spaced apart by a first period based on a first rule;
   a second reflector provided separate from the first reflector in a vertical direction, the second reflector comprising a plurality of second sub-wavelength structures that are two-dimensionally arranged in the horizontal direction and spaced apart by a second period based on a second rule, the plurality of second sub-wavelength structures corresponding to the plurality of first sub-wavelength structures in the vertical direction,
   wherein when viewed from a plan view, shapes of the plurality of first sub-wavelength structures and shapes of the plurality of second sub-wavelength structures are without shape anisotropy, and
   wherein a width of each of the plurality of first sub-wavelength structures is greater than a width of each of the corresponding plurality of second sub-wavelength structures.

2. The optical filter of claim 1, wherein a refractive index of each of the plurality of first sub-wavelength structures and a refractive index of each of the plurality of second sub-wavelength structures are higher than a refractive index of a peripheral material that surrounds each of the plurality of first sub-wavelength structures and each of the plurality of second sub-wavelength structures, and
   wherein an absorption coefficient of each of the plurality of first sub-wavelength structures and an absorption coefficient of each of the plurality of second sub-wavelength structures are lower than an absorption coefficient of the peripheral material.

3. The optical filter of claim 2, further comprising a substrate having a refractive index that is lower than the refractive index of each of the plurality of first sub-wavelength structures,
   wherein the first reflector is provided on an upper surface of the substrate.

4. The optical filter of claim 3, further comprising a first material layer having a refractive index that is lower than the refractive index of each of the plurality of first sub-wavelength structures,
   wherein the first material layer encapsulates the first reflector.

5. The optical filter of claim 4, further comprising a second material layer having a refractive index that is lower than the refractive index of each of the plurality of second sub-wavelength structures,
   wherein the second material layer is provided on the first material layer and encapsulates the second reflector.

6. The optical filter of claim 5, wherein the first material layer and the second material layer comprise a same material.

7. The optical filter of claim 1, wherein each of the plurality of first sub-wavelength structures and each of the plurality of second sub-wavelength structures comprise a dielectric material or a semiconductor material.

8. The optical filter of claim 1, wherein each of the plurality of first sub-wavelength structures and each of the plurality of second sub-wavelength structures have a cylindrical shape or a regular polyprism shape.

9. The optical filter of claim 1, wherein the first rule and the second rule are the same.

10. The optical filter of claim 1, wherein each of the plurality of first sub-wavelength structures and each of the plurality of second sub-wavelength structures have a same shape.

11. The optical filter of claim 10, wherein the plurality of first sub-wavelength structures and the plurality of second sub-wavelength structures are arranged to face each other in a direction in which the first reflector and the second reflector are separated.

12. The optical filter of claim 1, wherein the plurality of first sub-wavelength structures and the plurality of second sub-wavelength structures are two-dimensionally arranged in regular triangular lattice forms, respectively.

13. The optical filter of claim 1, wherein the plurality of first sub-wavelength structures and the plurality of second sub-wavelength structures are two-dimensionally arranged in square lattice forms, respectively.

14. The optical filter of claim 1, wherein the plurality of first sub-wavelength structures or the plurality of second sub-wavelength structures are two-dimensionally arranged in a regular triangular lattice form, and the other of the plurality of first sub-wavelength structures and the plurality of second sub-wavelength structures are two-dimensionally arranged in a square lattice form.

15. The optical filter of claim 1,
   wherein the plurality of first sub-wavelength structures and the plurality of second sub-wavelength structures are arranged to face each other in a direction in which the first reflector and the second reflector are separated.

16. An optical filter comprising:
   a first reflector comprising a plurality of first sub-wavelength structures that are two-dimensionally arranged in a horizontal direction and spaced apart by a first period based on a first rule;
   a second reflector provided separate from the first reflector, the second reflector comprising a plurality of second sub-wavelength structures that are two-dimensionally arranged in the horizontal direction and spaced apart by a second period based on a second rule; and a third reflector provided separate from the second reflector and opposite to the first reflector with respect to the second reflector in a vertical direction, the third reflector comprising a plurality of third sub-wavelength structures that are two-dimensionally arranged in the horizontal direction and spaced apart by a third period based on a third rule.

17. The optical filter of claim 16, wherein each of the plurality of first sub-wavelength structures, each of the plurality of second sub-wavelength structures, and each of the plurality of third sub-wavelength structures have a same shape.

18. The optical filter of claim 16, wherein the plurality of first sub-wavelength structures, the plurality of second sub-wavelength structures, and the plurality of third sub-wavelength structures are arranged to face each other a direction in which the first reflector, the second reflector, and the third reflector are separated.

19. A spectrometer comprising:
a first optical filter comprising:
a first reflector comprising a plurality of first sub-wavelength structures that are two-dimensionally arranged in a horizontal direction and spaced apart by a first period based on a first rule, and
a second reflector comprising a plurality of second sub-wavelength structures that are two-dimensionally arranged in the horizontal direction and spaced apart by a second period based on a second rule, the second reflector being provided separate from the first reflector in a vertical direction and the plurality of second sub-wavelength structures corresponding to the plurality of first sub-wavelength structures in the vertical direction,
wherein when viewed from a plan view, shapes of the plurality of first sub-wavelength structures and shapes of the plurality of second sub-wavelength structures are without shape anisotropy, and
wherein a width of each of the plurality of first sub-wavelength structures is greater than a width of each of the corresponding plurality of second sub-wavelength structures;
a second optical filter comprising:
a third reflector comprising a plurality of third sub-wavelength structures that are two-dimensionally arranged in the horizontal direction and spaced apart by a third period based on a third rule, and
a fourth reflector comprising a plurality of fourth sub-wavelength structures that are two-dimensionally arranged in the horizontal direction and spaced apart by a fourth period based on a fourth rule, the fourth reflector being provided separate from the third reflector in the vertical direction and the plurality of fourth sub-wavelength structures corresponding to the plurality of third sub-wavelength structures in the vertical direction,
wherein a width of each of the plurality of third sub-wavelength structures is greater than a width of each of the corresponding plurality of fourth sub-wavelength structures,
wherein when viewed from a plan view, shapes of the plurality of third sub-wavelength structures and shapes of the plurality of fourth sub-wavelength structures are without shape anisotropy; and a sensor substrate comprising a plurality of light detectors that are arranged to face the first optical filter and the second optical filter, respectively.

20. The spectrometer of claim 19, wherein the sensor substrate, the first optical filter, and the second optical filter are formed monolithically.

21. An electronic apparatus comprising:
a light source configured to emit light;
a spectrometer provided on a path of light emitted from an object that is irradiated by the light emitted from the light source and configured to detect the light emitted from the object, the spectrometer comprising:
a first optical filter comprising:
a first reflector comprising a plurality of first sub-wavelength structures that are two-dimensionally provided in a horizontal direction and spaced apart by a first period based on a first rule, and
a second reflector comprising a plurality of second sub-wavelength structures that are two-dimensionally arranged in the horizontal direction and spaced apart by a second period based on a second rule, the second reflector being provided separate from the first reflector in a vertical direction and the plurality of second sub-wavelength structures corresponding to the plurality of first sub-wavelength structures in the vertical direction,
wherein a width of each of the plurality of first sub-wavelength structures is greater than a width of each of the corresponding plurality of second sub-wavelength structures, and
wherein when viewed from a plan view, shapes of the plurality of first sub-wavelength structures and shapes of the plurality of second sub-wavelength structures are without shape anisotropy;
a second optical filter comprising:
a third reflector comprising a plurality of third sub-wavelength structures that are two-dimensionally arranged and spaced apart by a third period based on a third rule, and
a fourth reflector comprising a plurality of fourth sub-wavelength structures that are two-dimensionally arranged and spaced apart by a fourth period based on a fourth rule,
wherein when viewed from a plan view, shapes of the plurality of third sub-wavelength structures and shapes of the plurality of fourth sub-wavelength structures are without shape anisotropy; and
a sensor substrate comprising a plurality of light detectors provided to face the first optical filter and the second optical filter; and
a processor configured to determine at least one of a physical property, a shape, a position, and a motion of the object based on the light detected by the spectrometer.

22. An optical filter comprising:
a first reflector comprising a plurality of first sub-wavelength structures that are two-dimensionally arranged in a horizontal direction and spaced apart by a first period based on a first rule; and
a second reflector provided separate from the first reflector, the second reflector comprising a plurality of second sub-wavelength structures that are two-dimensionally arranged in the horizontal direction and spaced apart by a second period based on a second rule, the second reflector being provided separate from the first reflector in a vertical direction and the plurality of second sub-wavelength structures corresponding to the plurality of first sub-wavelength structures in the vertical direction, wherein at least one of width, thickness and period is different between the plurality of first sub-wavelength structures and the plurality of second sub-wavelength structures.

* * * * *